US007181344B2

(12) United States Patent
Lehmann et al.

(10) Patent No.: US 7,181,344 B2
(45) Date of Patent: Feb. 20, 2007

(54) DATABASE SYSTEM FOR NAVIGATION DEVICE

(75) Inventors: Andreas Lehmann, Hamburg (DE); Joachim Wietzke, Karlsruhe (DE); Ingo Nagel, Seevetal (DE); Jürgen Hellmich, Hamburg (DE)

(73) Assignee: Harman Becker Automotive Systems GmbH (DE)

( * ) Notice: Subject to any disclaimer, the term of this patent is extended or adjusted under 35 U.S.C. 154(b) by 170 days.

(21) Appl. No.: 10/824,948

(22) Filed: Apr. 15, 2004

(65) Prior Publication Data

US 2005/0038599 A1 Feb. 17, 2005

(30) Foreign Application Priority Data

Apr. 15, 2003 (EP) .................................. 03008092

(51) Int. Cl.
*G01C 21/32* (2006.01)

(52) U.S. Cl. ...................................... 701/208; 701/213

(58) Field of Classification Search ........ 701/200–202, 701/208, 211, 213–214; 340/988, 995.1; 342/357.06, 357.12, 357.13

See application file for complete search history.

(56) References Cited

U.S. PATENT DOCUMENTS 4,675,676 A * 6/1987 Takanabe et al. ...... 340/995.15
4,954,959 A * 9/1990 Moroto et al. .............. 701/211
4,984,168 A * 1/1991 Neukrichner et al. ....... 701/210
6,507,850 B1 1/2003 Livshutz et al.
2001/0025223 A1 9/2001 Geiger et al.

FOREIGN PATENT DOCUMENTS

EP 0 330 787 A2 12/1988
EP 0 330 787 B2 12/1988

* cited by examiner

*Primary Examiner*—Y. Beaulieu
(74) *Attorney, Agent, or Firm*—Brinks Hofer Gilson & Lione

(57) ABSTRACT

A database system for a global positioning (GPS) vehicular navigation device having a first database including street information data and a second database, including location information data that is independent of the first data. The database system includes a working memory unit including a first memory area and a second memory area separate from the first memory area. The first data includes street information stored in the first memory area and the second data includes location information stored in the second memory area.

20 Claims, 5 Drawing Sheets

DATABASE SYSTEM FOR NAVIGATION DEVICE

PRIORITY CLAIM

This application claims the benefit of European Patent Application No. EP 03008092.3, filed Apr. 15, 2003, which is hereby incorporated by reference herein in its entirety.

BACKGROUND OF THE INVENTION

1. Technical Field

This application relates to a system and method for the efficient and cost-effective storage and utilization of database information provided to a navigation device. In particular, this application relates to a system and method for the storage and utilization of geographic data for use in a GPS navigation device, in particular a vehicular GPS navigation device.

2. Related Art

Computer-based navigation systems are available that provide end-users (such as operators of vehicles, for example, automobiles, trucks, marine vehicles, airplanes, helicopters, and other types vehicles, in which the navigation systems have been installed) with various navigating functions and features. For example, some navigation systems may determine an optimum route of travel between two locations. In such a navigation system, a current position of a vehicle is detected by equipment that is capable of determining the vehicle's physical location, such as equipment utilizing a global positioning system (GPS). A navigation application program then may assess the various alternative routes between the two locations available to the operator and determine the optimum route. The system also may identify and provide the user with other information such as instructions for the route and the manoeuvres that may be required to execute the route. In one example of a navigational system, road map data and information relating to a road map data are obtained from a storage medium, for example, a compact disc or DVD mounted on the navigation device. The desired route from the current vehicle position to the desired destination point input by a user is determined, and the vehicle is guided from the current location along the determined route to the destination by using picture and voice.

Known navigation systems contain street data relating to the geometrical aspects of the street, for example, the position, the length, the geographical altitude, and the direction of the street. Using this street information data, a map can be built and presented on a display unit. Terms, present, presentation and presented are not limited to visual presentation, but are intended to encompass all means of presentation of data such as, for example, audio, visual, and combined audio and visual. The geometrical street data are normally stored as vectors indicating the length and the direction of the street. Various terminologies for describing the aspects of street information, and these other terminologies are intended to be encompassed within the scope of these concepts.

In addition to street information, navigation systems may comprise additional data containing location information. The location information data may include the name of the streets, classification of the streets, the type of street, for example a highway or a pedestrian zone, as well as other information. This location information data may also include information regarding hotels, gas stations, restaurants, landmarks, points of interest or any other information that may be helpful for the user of the navigation device.

Generally, navigation systems may receive and store the location information data together with the street information data, and thus, the data containing location information may be linked to the street data. If the data needed to present a certain region of a map is loaded into the data buffer of the navigation system, the whole data including street data together with a link to the other data containing location information is loaded. Where the data needed to present a certain region of a map is large, there may be insufficient space in the navigation system buffer to store and provide all of the street as well as the desired location information. Additionally, the storing of these data is highly complex and very time-consuming, requiring a large memory space to store the complete data.

Electronic travel guides are known in which additional location information data, for example, data of famous monuments, buildings, towns, or villages are stored on an electronic medium, such as a CD, together with their geographical position data. In known navigation systems, the information stored in these electronic travel guides may be loaded into the working memory of the navigation device and presented, for example, on a display of the navigation device. If, however, the navigation device is used to navigate the user to a certain destination, the whole working memory space may be filled with the map data needed to indicate the itinerary to the chosen destination. In such a situation, the user of the navigation device wants to have additional information from the electronic travel guide, this travel guide cannot be used simultaneously with the operating mode of the navigation device, for example, for navigating the vehicle. Thus, when the additional location information stored on the electronic storage medium of the travel guide is to be presented, this information of the electronic travel guide has to be loaded into the working memory of the navigation device and all or part of the information comprising the map data must be cleared from the working memory to make room for the location information. In conventional systems, switching between the two operation modes without clearing some of the memory in use for the navigation function is very difficult if not impossible. Therefore, there is a need for a navigation system which enables flexible presentation of street and location information.

Location information and street information typically are stored together in a single database. If a user desires updated location information, he may be required to purchase updated street information as well as the updated location information, thereby increasing his costs. Thus there is a need for a navigation system that enables cost-effective updates to the system.

SUMMARY

The invention provides a database system for a navigation device and, in particular, a database system for a global positioning (GPS) vehicular navigation device having a first database comprising street (map) information data and a second database comprising location information data. The street information data in the first database may be independent of the location information data in the second database. For example, the street information data and the location information data may not be linked, i.e, the data of one type does not point to the data of the other type, although the data may be contained on the same storage medium. Thus, the location information data from the second database may be supplied independently of the street information data to the working memory of the navigation device, and the location information data may be used at the same time the street information is being used, without accessing or overwriting the street information. Further, the location information data may be updated without updating the street information data. Additionally, the two data may be processed separately by the processing unit.

A database system is provided for a global positioning system (GPS) vehicular navigation device having a first database comprising street information data; a second database comprising location information data, with the street information data being independent of the location information data; a working memory unit comprising a first memory area and a second memory area separate from the first memory area, where at least a portion of the street information is stored in the first memory area and at least a portion of the location information is stored in the second memory area. The memory areas may be dedicated memory areas to each of their respective first and second data.

A third database comprising blocks of data sets that relate to the geographical position data of the second database may be provided. Each block may comprise an index relating to the geographical information of the data sets of the block. The third database may facilitate the search of data relating to location information of a specific geographical location.

In addition, a method for providing information to a navigation device is provided, comprising storing street information data in a first database; storing location information data which is independent of the street information data, in a second database; providing at least a portion of the street information data to a first memory area of a working memory unit associated with the navigation device; providing at least a portion of the location information data to a second memory area of the memory unit; processing either or both the portions of the street information data and the location information data; and providing the processed information to the navigation device.

The system also may include a method for operating a navigation device in a vehicle comprising detecting a GPS signal identifying the location of the vehicle; retrieving street information data from a first database; supplying at least a portion of the street information data to a first memory area of a working memory unit; retrieving location information data from a second database independent of the first database; supplying at least a portion of the location information data to a second memory area of a working memory unit; processing the portions of the street information data and location information data, providing the processed data to the navigation device, and presenting the processed data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This application relates to a system for the efficient and cost-effective storage and utilization of database information provided to a navigation device. In particular, this application relates to a system and method for the storage, utilization, and upgrading of geographic and other data for use in a Global Positioning System (GPS) navigation device, in particular a vehicular GPS navigation device.

There is a need for a navigation system comprising a database system having a simple flexible structure where the street and location information in the navigation system are supplied to the system independently and stored separately in the navigation system. There is also a need for a navigation system where different databases available to the system can be used and updated independently of the other without the need to use or update the other databases. There is also a need for a navigation system where different types of data supplied to the navigation system can be used and presented simultaneously without one set of data overwriting the other.

Figure 1:
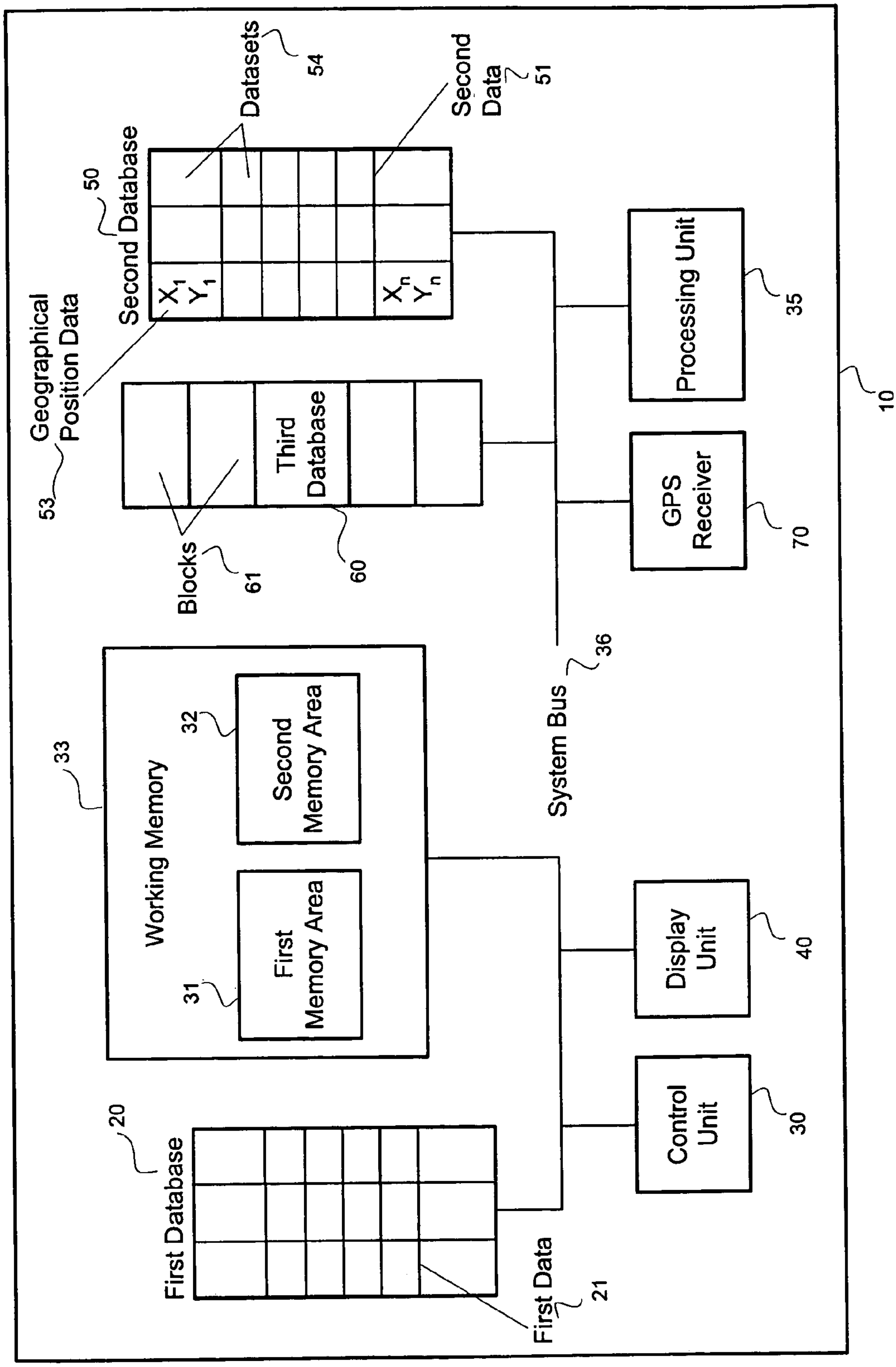
FIG. 1 is schematic view of a database system for a navigation device.
Figure 2:
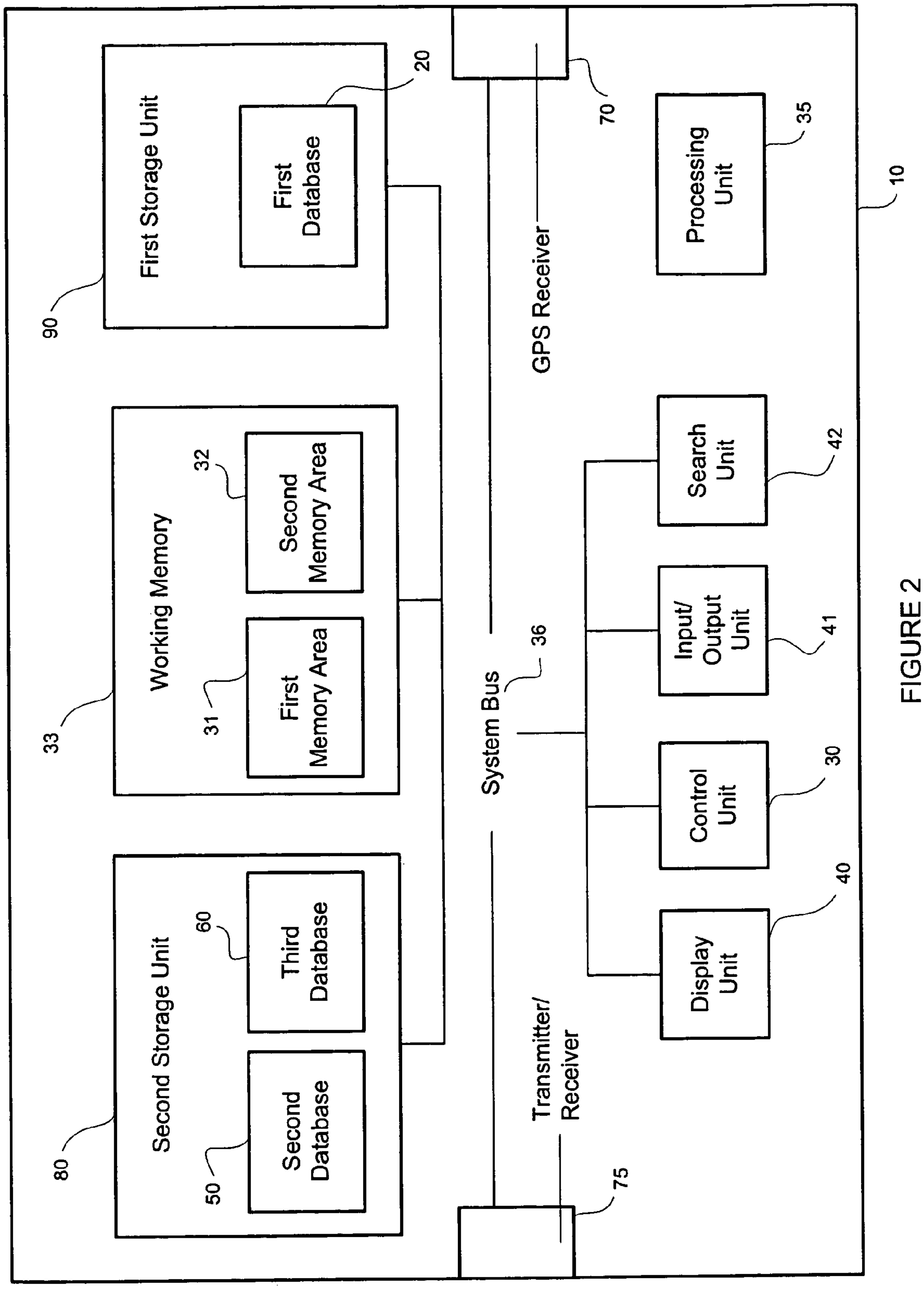
FIG. 2 is a schematic view of a database system for a navigation device.

A database system for a navigation device and, in particular for GPS vehicular navigation device for providing street information and location information to the navigation device is shown in FIGS. 1 and 2. The database system 10 for a navigation device may have at least a first database 20 and a second database 50. The first database 20 may comprise street (map) information data. The first database 20 may contain additional information or may only contain street information data. The second database 50 may comprise additional information or only location information. The location information data may be independent of the street information data. By "independent" it is meant that the first and second data are not dependent on one another to access, interpret, process or use information in the databases. In this manner, the second data 51 may be used without using the first data 21, and vice versa. The data of the first and second databases may be physically and logically separate from one another and the data from the respective databases may be independently supplied to the database system of the navigation device and used independently. The storage capacity needed, therefore, for each database may be reduced.

As shown in FIGS. 1 and 2, database system 10 is also provided for a GPS vehicular navigation device having a first database 20 comprising street information data; a second database 50, comprising location information data which is independent of the street information data; a working memory unit 33 comprising a first memory area 31 and a second memory area 32 separate from the first memory area, where the first data 21 comprising street information is stored in the first memory area 31 and the second data 51 comprising location information is stored in the second dedicated memory area 32. The global positioning navigation device comprises a GPS receiver 70 for determining the location of the vehicle. The GPS receiver 70 may be installed in a vehicle. The GPS receiver receives the signals emitted from the GPS satellites in space and an exact position of the vehicle is determined. The GPS signal received by the navigation device 10 may be compared to the geographical position data 53 of the second database 50. The navigation device 10 may also comprise an input/output unit 41 and a transmitter/receiver unit 75 for wireless communication to the first and/or second databases.

In FIG. 1, a navigation device 10 comprises a first database 20 containing first data 21 comprising street information data. "Street information" may be any data that pertains to the geometrical aspects of a street or roadway network, including, though not limited to, the position of the street (latitude and longitude), the length of the street, the geographical altitude of the street, the direction of the street, roadway intersections and other aspects. These aspects may be used to compile a map that may be presented to a user, such as visually displayed by the navigational system on, for example, a monitor associated with the navigational system. In FIG. 1, control unit 30 provides a display device 40 with data 21 from the first database 20 to present a street map for a particular area.

First database 20 may contain the street information as vectors indicating the direction and the length of the street. The first database 20 may comprise any data compilation, including a file and may be stored in a first storage unit and the second database 50 may comprise another data compilation, including a file, and may be stored in a second storage unit, as shown in FIG. 1. Or, the first and second databases may be stored in a single file, segmented from one another. The first and second databases may be stored on CD-ROMS, PCMCIA cards, fixed or hard disks, DVDs, or other currently available storage media, as well as storage media that may be developed in the future. For example, the first database 20 may be stored on one CD-ROM and the second database 50 stored on a second CD-ROM. Alternatively, both databases may be stored in separate areas of the same CD-ROM. The databases do not have to be physically provided at the location of the navigation system. One or both of the databases may be located remotely from the rest of the navigation system and provided via a communications link. For example, the second data 51 may be stored on a separate storage unit comprising a server that is remote from the navigation device and provides the second data to the navigation device via a mobile communication link. Additional location data transmitted to the second database can be saved in RAM, Flash Memory, on a hard disk or other device after the data has been downloaded to the navigation device.

The second database 50, comprising second data 51, may include location information. "Location information" may be any data relating to a particular location on a map including, though not limited to, road related data, for example the name of the street, the legal direction of the street, governmental or other classification of the street, the type of roadway, speed limitations, directional signage, vehicle weight limitations, and other vehicle restrictions. Road related location information may also include, in addition to information contained on street or highway signs, "virtual" street signs, such as weather related information that may be detected by sensors on the vehicle or obtained from some other source, curvature radii of the street, and other physical conditions or aspects of the street or location. Location information may also include information on special destinations or Points of Interest (POIs), for example gas stations, convenience stops, rest stops, museums, hotels, restaurants, monuments, hospitals, and the like. Generally location information changes more frequently than street information. In conventional systems, the updating of location information generally also requires the simultaneous purchase of street information, which may or may not have changed and require updating.

The second database 50 may contain geographical position data 53, and the location information of the second database 50 may be arranged according to the geographical positioning data 53. Additionally, the location information may be stored in datasets 54 that are arranged on the second database 50 according to the geographical position data 53. The location information data, along with geographical position data 53 meeting a predetermined requirement, may be supplied to the navigation system for processing. Predetermined requirements may include a predetermined location on a map, a predetermined itinerary to a predetermined destination, location information from one reference point to the next, all geographical position data within a predetermined distance to a reference point, and the like. The reference point may correspond to the geographical position of a vehicle having a navigation device or a destination input by the user. All location information data meeting a predetermined requirement may then be supplied to navigation apparatus and transmitted to the user. A search unit 42 may be used to locate all location information meeting the predetermined requirement. For example, a search may be made of all of the location information data for an area between one reference point and another. Once the search for this information of the second database is completed, the information is supplied to the navigation device. The search may be facilitated by a third database 60 comprising blocks 61 relating to the geographical position data of the second database and an index.

Location information meeting a predetermined requirement may be presented on a display device of the navigation apparatus or may be announced by voice. Location information also may be presented by a video on a display. Additionally, the first data 21 stored in the first database 20 and the second data 51 stored in the second database 50 may be processed and presented together on a display unit 40 by any means known to one skilled in the art. For example, the processor may process the street information as one task and the location information as another task, and then feed both to a common display task. Hence, the display unit 40 of the navigation system may provide street information and location information at the same time. For example, the presentation may be in the format of a split screen mode where the map or street information is displayed on one part of the screen and information relating to a particular point of interest is displayed on another part of the screen.

The second database 50 may communicate with a control unit of the database system by wireless communication. For example, the second database 50 containing the location information can be part of a server which is accessible with a TCP/IP protocol by using the worldwide web, thus permitting the more frequent updating of the location information data independent of the street information data. Data transmission between the navigation device and the second database may also be accomplished by using infrared, bluetooth, wireless LAN, GSM, GPRS and/or UMTS or any other technology suitable for transmitting these data.

The street information data and location information data may be provided independently of one other, such as in separate databases. Additionally, the street information data and the location information data may be independently supplied to the navigation device and stored separately in the navigation device in memory areas dedicated to the type of information. Because the street information data and the location information data may be provided and stored independently, there is increased flexibility in the handling of the data. For example, the location information may be used without using the street information. Moreover, both sets of data may be supplied to and presented by the navigation system, simultaneously and independently of one another. This allows the volatile or working memory 33 of the navigation system 10 to be more efficiently and effectively utilized. In addition, the location information data may be updated more easily and efficiently since the street information and location information are independent of one another. Thus, updates to location information data can be separately and more inexpensively acquired.

The second database 50 also may include different data fields 52. In at least one data field, geographical position data 53 are stored. The geographical position data 53 and the data fields 52 may be used to build data sets 54. Each data set 54 may be stored in the second database 50 according to its geographic position x and y. In this way the arrangement of the datasets 54 in the second database 50 corresponds to the geographical position data 51. Thus, the second database may be built by ranking the different data sets according to the global position ranking from the global positioning data. In the other data fields 52, location information for the geographical position x,y may be stored. As referred to previously, this information may be any data relating to a particular location on a map including, though not limited to, road related data, for example the name of the street, the legal direction of the street, governmental or other classification of the street, the type of roadway, speed limitations, directional signage, vehicle weight limitations, and other vehicle restrictions. Road related location information may also include, in addition to information contained on street or highway signs, "virtual" street signs, such as weather related information that may be detected by sensors on the vehicle or obtained from some other source, curvature radii of the street, and other physical conditions or aspects of the street or location. The location information stored in each dataset 54 may also include points of interest (POI) in which any information available relating to such things as restaurants, hotels, and the like, can be stored. In addition to the geographical position data 53, datasets 54 may also include direction information, speed limitations or positions where radar speed checks are made.

As shown in FIG. 1, to facilitate locating certain geographical position data, a third database 60 may be provided. The third database 60 may include different blocks 61 that relate to the geographical position data of the second database 50. Each block 61 may also include the geographical position data 53 of at least one data set 54. Each block 61 may also comprise an index to the geographical information of the datasets 54 contained in the block 61. The third database 60 may facilitate the search of data relating to location information of a specific geographical location. The third database 60 may be stored in a separate storage unit from the first and second databases. Alternatively, the third database may stored in the storage unit of either the first or second database.

The navigation system 10 may further comprise a GPS receiver 70 for receiving a GPS signal emitted by GPS satellites. The GPS receiver 70 receives the emitted signal and determines the exact position of the navigation system 10, normally present in a vehicle. Though other navigational systems such as hand-held systems are also contemplated. If determining location of a navigation device by GPS is not possible or is faulty, for example when not enough GPS satellites are detected by the GPS receiver, the location of the navigational device can be determined by "dead reckoning." In this instance, other signals may be utilized to determine the location of the navigational system, for example, signals from gyromagnetic devices, information from wheel sensors, and information from map matching.

The database system 10 also may include a working memory unit 33 with a first memory area 31 for storing the first data 21 and a second memory area 32 for storing the second data 51. The working memory unit 33 may be a random access memory (RAM) or other volatile memory of the navigation device. The working memory unit 33 may be divided into at least two separate and discrete areas, each area being "reserved" for or "dedicated" to the first data 21 and for the second data 51. "Dedicated" means that the first memory area 31 receives and stores first data 21 from the first database 20 and the second memory area 32 receives and stores second data 51 from the second database 50. Although the data may be independent of one another, the data of the first and second databases may contain some of the same information. For example, certain first database data that may be required to compile the map may include the street name. The street name may be also included in the location information.

By providing dedicated memory areas in the working memory unit, the first data containing street information and the second data containing location information may be accessed and used simultaneously, without the need to switch from an operation mode in which the navigation device is directing the vehicle, to a different mode to obtain location information. Thus, the processing unit can process these two data at the same time and supply the two data to the navigation device for presentation without the need to clear the memory area of the working memory unit before loading further data. Consequently, both the first and second data may be processed and presented at the same time, without the need to remove or overwrite data in the memory area. Thus, the operator of the navigation system may use the navigation mode of the navigation device while at the same time access desired location information, because the processing unit separately and independently accesses and processes the separate data in the respective memory areas.

During use, the first data 21 of the first database 20 are provided to first memory area 31 of the working memory unit 33. The second data 51 of the second database 50 are provided to a second memory area 32 of the working memory 33. The navigation system may include a processing unit 35 for accessing and processing the first data 21 and the second data 51. The processing unit 35 accesses the first and second data from the first and second databases and provides the data to their respective memory areas of the working memory of the navigation system. The processing unit 35 processes the data in the memory areas and provides the data to the navigation system 10 for presentation. The processing unit 35 may be of any type used in navigation systems, such as those known in the art and sold by, for example, Hitachi, Intel, and Motorola. The first data 31 and the second data 51 may be provided simultaneously to their respective memory areas in the working memory 33, so that the data may be processed simultaneously and, subsequently, presented on the display device 40 of the navigation system 10 simultaneously. The components of the navigation system 10 communicate with each other via a bus system 36.

In FIG. 2, navigation device 10 comprises control unit 30, processing unit 35, working memory unit 33, with at least a first memory area 31 and a second memory area 32, GPS receiver 70, first storage unit 90 (which comprises first database 20), second storage unit 80 (which comprises second database 50 and third database 60). First storage unit 90 comprises first data containing at least street information. Second storage 80 unit comprises the second database 50 containing at least location information, and third database 60 containing blocks (as shown in FIG. 1). Navigation device 10 may further comprise a display unit 40, an input/output unit 41 and a search unit 42.

During use, a navigation device 10 having a GPS receiver 70 detects a GPS signal corresponding to the location of the navigation device, for example in a vehicle. First data 21 stored in a first database 20, comprising street information, are supplied to a first memory area 31 of a working memory unit 33 of the navigation device 10, such as the RAM of the device. Second data 51, independent of the first data 21, from a second database 50 comprising location information and its geographical position may be supplied to a second memory area 32 of the working memory unit 33 of the navigation device 10. The first and second data are processed by a processing unit 35 and supplied to the navigation device 10. The second data 51 that are supplied may be that which meets a predetermined requirement, discussed previously. Thereafter, the position of a vehicle having the navigation device may be presented together with the corresponding location information data.

Figure 3:
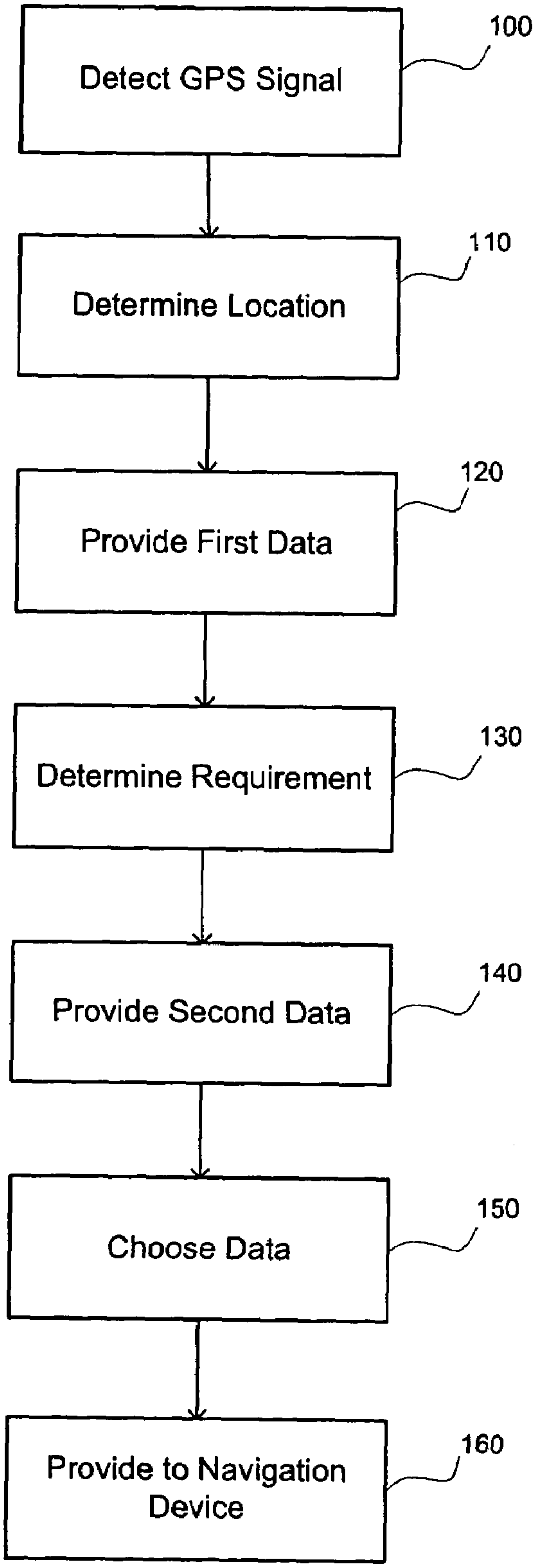
FIG. 3 is a flow chart showing a method for providing information to a navigation device.

In FIG. 3, a method of operating a navigation system of the invention is illustrated. A GPS signal of a vehicle having a navigation system is detected (Step 100) and the location of the vehicle is determined (Step 110). First data stored in the first database are provided to the first memory area of a working memory unit of the navigation device, the data is processed and a street map is presented on the display unit (Step 120). A predetermined requirement may be identified, for example, the user of the device desires to know all of the restaurants, hotels, or gas stations that are within a certain distance of a destination (Step 130). The data meeting the predetermined requirement may then be chosen (Step 150) from the second database. The first data and the second data that met the predetermined requirement are provided to the first memory area and second memory area, respectively, of the working memory unit. The processing unit accesses the first and second memory units, processes the data therein, and provides the processed data to the navigation device (Step 160). The second data comprising the predetermined requirement can be presented on the display device of the navigation device together with the first data containing the street information.

Figure 4:
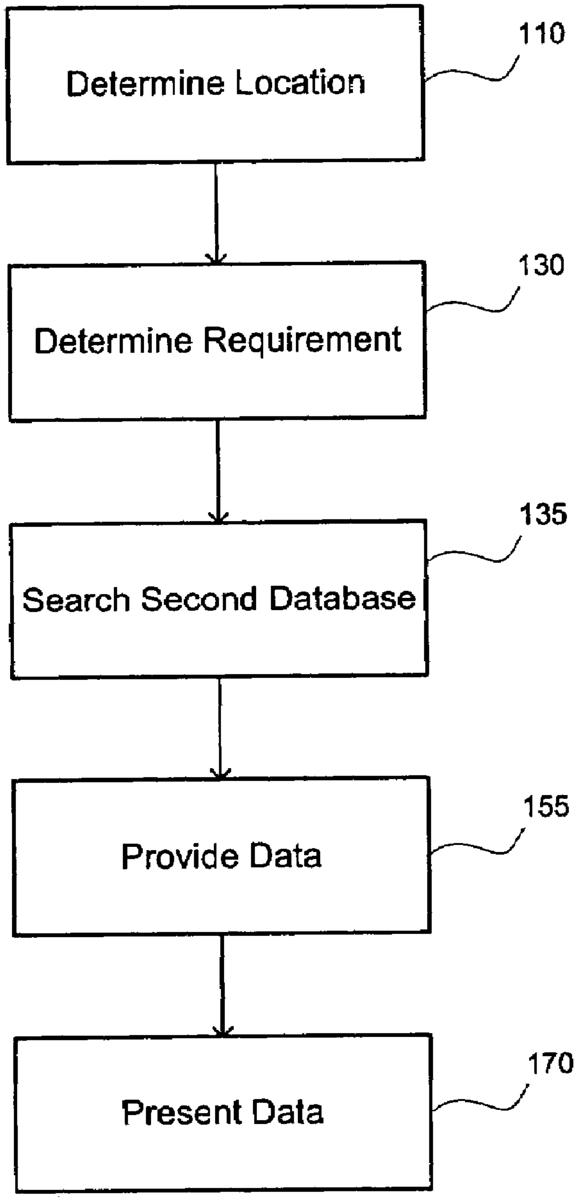
FIG. 4 is a flow chart showing a method for providing location information from a second database to a navigation device.

In FIG. 4, after determining the location of the navigation device in the moving vehicle (Step 110), a predetermined requirement may be determined (Step 130). For example, the requirement may contain the information that as soon as the moving vehicle reaches a selected map area with a predetermined location, the search unit 42 searches in the second database 50 and/or in the second database 50 and the third database 60 for the predetermined location. For example, as soon as the vehicle arrives at or near the predetermined location, location information, such as information about a famous monument and its history, is provided. In addition, an ongoing circular search within a particular radius about the vehicle position to identify special points of interest may be performed. The circular search also may include a search for particular location information within an increasing radius, such as identification of the nearest three golf courses. The found data are provided to the second memory area of the working memory of the navigation device (Step 160) and then presented by the navigation device (Step 170). The presentation may comprise a video or voice sequence informing the user of the vehicle of the chosen monument and/or may contain the distance of the monument from the actual location of the vehicle. At the same time, notwithstanding the presentation of this information, the first data containing the street map also may be presented. Additionally, the second data containing the location information may be integrated within the presentation of the street information.

Figure 5:
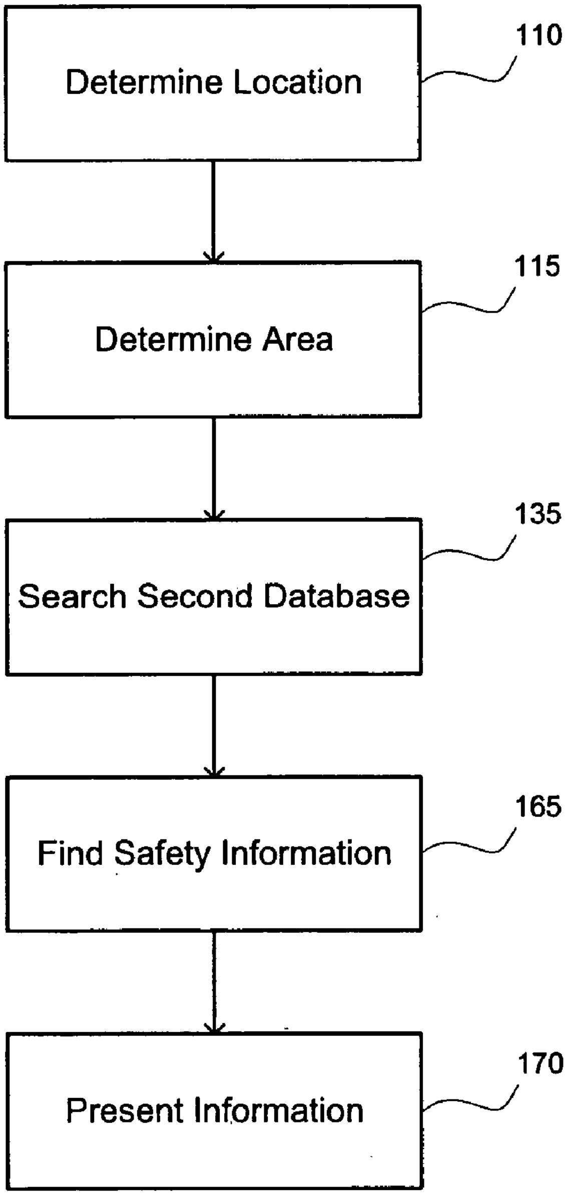
FIG. 5 is a flow chart showing a method for providing safety information to a navigation device.

In FIG. 5, the location of a moving vehicle is determined (Step 110), and an area around the location of the vehicle may be determined, for example an area comprising a circle having a predetermined radius, the center of the circle being the position of the vehicle (Step 115). The area around the location of the vehicle can be made dependent on the vehicle speed, for example, when the vehicle is at a higher speed the area chosen may be larger than that chosen at a lower speed. A search of the second database is performed, for example, the object of the search may be to find all of the safety information, such as speed limits, or any road related data such as curvature radii or road conditions in a given area (step 165). The safety information is found and then presented by navigation device (Step 170). In this example, during a journey, the navigation device receives the current position of the vehicle via GPS and may determine the type of road on which the vehicle is travelling. In addition, when the operator arrives at a certain geographical position, the navigation device can inform and remind the user of the safety information in the area, such as the speed limit and other safety information, for example, dangerous road conditions or bad weather conditions. The conditions may be transmitted to the navigation device via wireless communication or by other sensors of the vehicle. In this example, the second database comprising the second data containing this location safety information may be part of a remote server which provides the data.

While various aspects of the invention have been described, it will be apparent to those of ordinary skill in the art that many more aspects and implementations are possible within the scope of the invention. Accordingly, the invention is not to be restricted except in light of the attached claims and their equivalents.

What is claimed is:

1. A navigation system, comprising:

a processor programmed to execute data associated with a position of a vehicle;

a first memory operatively coupled to the processor to store a first database of files comprising street data;

a second memory operatively coupled to the processor to store a second database of files comprising data related to a location; and a working memory coupled to the processor and remote from the first memory and the second memory, where the working memory is partitioned into a third memory and a fourth memory that provide parallel access to data stored in the first database and the second database, and where the third memory and the fourth memory are configured to be written to and read from within the vehicle.

2. The navigation system of claim 1 where the third memory and the fourth memory are configured to retain duplicate portions of data stored in the first database and the second database, respectively.

3. The navigation system of claim 1 where the third memory and the fourth memory provide simultaneous access to data stored in the first database and the second database.

4. The navigation system of claim 1 where the processor is programmed to process data from the first database and data from the second database without switching between navigation system operating modes.

5. The navigation system of claim 1 further comprising a fifth memory operatively coupled to the processor to store a third database comprising data blocks that relate to position data stored in the second database.

6. The navigation system of claim 5 where the working memory comprises a memory that is erased only in blocks.

7. The navigation system of claim 6 where an organization of the second database is based on the position data and where the processor is operable to search the second database based on location information of a geographical location using data retained in the third database.

8. A navigation system comprising:

a receiver operable to receive a plurality of coded signals comprising data associated with a position of a vehicle;

a processor programmed to interpret and execute the data associated with the position of the vehicle;

a first memory operatively coupled to the processor to store a first database of files comprising street data;

a second memory operatively coupled to the processor to store a second database of files comprising data related to a location; and a working memory coupled to the processor and remote from the first memory and the second memory, where the working memory is partitioned into a third memory and a fourth memory that provides parallel access to data stored in the first database and the second database, and where the third memory and the fourth memory are configured to be written to and read from within the vehicle.

9. The navigation system of claim 8 where the third memory and the fourth memory are configured to retain duplicate portions of data stored in the first database and the second database, respectively.

10. The navigation system of claim 8 where the third memory and the fourth memory provide simultaneous access to data stored in the first database and the second database.

11. The navigation system of claim 8 where the processor is programmed to process data from the first database and data from the second database without switching between navigation system operating modes.

12. The navigation system of claim 8 further comprising a fifth memory operatively coupled to the processor to store a third database comprising data blocks that relate to position data stored in the second database.

13. The navigation system of claim 12 where the working memory comprises a memory that is erased only in blocks.

14. The navigation system of claim 13 where an organization of the second database is based on the position data and where the processor is operable to search the second database based on the data associated with the position of the vehicle using data retained in the third database.

15. The navigation system of claim 9 where the plurality of coded signals further comprise a timing signal or a distance signal.

16. A method that operates a navigation system, comprising:

receiving a plurality of coded signals comprising data associated with a position of a vehicle;

processing the data associated with the position of the vehicle;

retrieving street data from a first database stored in a first memory;

retrieving location data from a second database stored in a second memory;

storing the street data and the location data in a working memory remote from the first memory and the second memory; and processing the street data and the location data, where the working memory is partitioned into a third memory and a fourth memory that provides parallel access to data stored in the first database and the second database, and where the third memory and the fourth memory are configured to be written to and read from within the vehicle.

17. The method of claim 16 where processing the street data and the location data comprises searching the second database based on the position of the vehicle.

18. The method of claim 16 where processing the street data and the location data comprises simultaneously processing the street data and the location data.

19. The method of claim 16 where processing the street data and the location data comprises processing the street data and the location data without switching between navigation system operating modes.

20. The method of claim 16 further comprising searching the second database using data retained in a third database, where the third database comprises data blocks related to position data.

* * * * *

UNITED STATES PATENT AND TRADEMARK OFFICE

CERTIFICATE OF CORRECTION

PATENT NO. : 7,181,344 B2
APPLICATION NO. : 10/824948
DATED : February 20, 2007
INVENTOR(S) : Andreas Lehmann et al.

It is certified that error appears in the above-identified patent and that said Letters Patent is hereby corrected as shown below:

<u>On the Title Page</u>

Item (30) in column 1, line 1, under "Foreign Application Priority Data", delete "03008092" and substitute --03008092.3-- in its place.

Signed and Sealed this

Fifth Day of June, 2007

JON W. DUDAS

*Director of the United States Patent and Trademark Office*